United States Patent [19]

Ochiai et al.

[11] Patent Number: 4,544,198
[45] Date of Patent: Oct. 1, 1985

[54] AUTOMOTIVE VEHICLE WITH FRONT AND REAR SLIDING DOORS

[75] Inventors: Akira Ochiai, Sagamihara; Yoshitaka Suzuki, Odawara, both of Japan

[73] Assignee: Nissan Motor Company, Limited, Yokohama, Japan

[21] Appl. No.: 513,688

[22] Filed: Jul. 14, 1983

[30] Foreign Application Priority Data

Jul. 16, 1982 [JP] Japan ................ 57-124191

[51] Int. Cl.⁴ .............................. B60J 5/04
[52] U.S. Cl. ...................... 296/155; 49/370
[58] Field of Search .......... 296/155; 49/370, 213–217, 49/221, 223, 225

[56] References Cited

U.S. PATENT DOCUMENTS

| | | | |
|---|---|---|---|
| 3,501,864 | 3/1964 | Erb et al. | 49/215 |
| 4,068,407 | 1/1978 | Podolan et al. | 49/215 |
| 4,152,872 | 5/1979 | Tanizaki et al. | 49/214 |

FOREIGN PATENT DOCUMENTS

| | | | |
|---|---|---|---|
| 57-45420 | 3/1982 | Japan | 296/155 |
| 57-41209 | 3/1982 | Japan . | |
| 370837 | 4/1932 | United Kingdom . | |
| 493234 | 10/1938 | United Kingdom . | |
| 505672 | 5/1939 | United Kingdom . | |
| 1227079 | 3/1971 | United Kingdom . | |
| 1316779 | 5/1973 | United Kingdom . | |

*Primary Examiner*—Robert R. Song
*Attorney, Agent, or Firm*—Schwartz, Jeffery, Schwaab, Mack, Blumenthal & Evans

[57] ABSTRACT

An automotive vehicle has a single integral door opening on each side of the door body. The door opening is closed by a pair of front and rear doors which are slidable along the vehicle side to open and close the door opening. The rear edge of the front sliding door and the front edge of the rear sliding door directly oppose each other without a vehicle body pillar therebetween. The opposing edges of the sliding doors have seals for water-proofing. Also, the upper edges of the sliding doors sealingly contact seals mounted on vehicle side frames extending along upper edge of the door opening for water-proofing. Guide rails slidingly supporting the sliding doors are mounted on the side frames in such a manner that they serve to reinforce the side frames. Lower seals are provided between the lower edges of the front and rear doors and the lower side frames for establishing water-tight seal therebetween.

4 Claims, 10 Drawing Figures

AUTOMOTIVE VEHICLE WITH FRONT AND REAR SLIDING DOORS

BACKGROUND OF THE INVENTION

The present invention relates generally to an automotive vehicle having a front and a rear sliding doors for opening and closing a door opening. More particularly, the invention relates to an automotive vehicle sliding door construction applicable for a center-pillarless vehicle.

Conventionally, various sliding door vehicle have been proposed. For example, U.S. Pat. No. 4,068,407 to Podolan et al discloses a Sliding Vehicle Door. The sliding door is opened by an initial laterally outward movement followed by a sliding movement along the exterior of the vehicle. The vehicle door assembly is supported at three points by a suspension mechanism on the leading edge combined with a lateral guide mechanism. A pivotal support member is mounted on the side of the door opening adjacent the door's leading edge and has rollers mounted thereon adapted to engage track means on the door. The pivotal member rotates from an initial closed door position, characterized by a substantially fore-and-aft alignment of the plane of the door, to a laterally outward position, thereby causing the leading edge of the door to move laterally outward from the vehicle body to permit subsequent sliding movement. The rollers are rotatable about vertical axes and one engages a cam plate member to direct the initial swinging movement of the pivotal member and subsequently enters the door track to permit the door to slide along the vehicle body.

As apparent from FIGS. 1 and 2 of Podolant et al, the disclosed sliding vehicle door has a single swingable and slidable vehicle door closing a door opening and is applicable to a center-pillarless vehicle body.

On the other hand, U.S. Pat. No. 3,501,864 to Erb et al discloses a Swingable Sliding Car Door assembly which can be opened or closed by a combination of swinging and sliding movement. Linkage means steady the door in all of its possible positions. The linkage means also guide and support the door while the same is being moved into and out of its closed position and effectively prevent tilting of the door out of its proper vertical alignment. The door can be gently closed, or can be slammed in the same manner as a hinged door. The entire linkage and guidance mechanism of the door is concealed except for a few barely noticeable slots on the outside of the car body and at the door frame so that the physical appearance of a car equipped with the door according to this U.S. patent is not marred.

As shown in FIGS. 5 through 7, Erb et al disclose sliding doors applicable for front and rear vehicle doors.

SUMMARY OF THE INVENTION

Therefore, it is an object of the present invention to provide a center-pillarless vehicle with front and rear sliding doors.

Another and more specific object of the present invention is to provide a vehicle with front and rear sliding doors opposing each other directly, i.e. without a center-pillar therebetween, which have bodywork with sufficient strength to resist bending stresses applied to the vehicle frames.

A further object of the invention is to provide a vehicle with directly opposing front and rear sliding doors which can establish a water-tight seal.

To accomplish the foregoing and other objects, an automotive vehicle according to the present invention, has a single integral door opening on each side of the vehicle body. The door opening can be closed by a pair of front and rear doors which are respectively slidable along the side of the vehicle for opening and closing the door opening. The rear edge of the front sliding door and the front edge of the rear sliding door directly oppose each other without a pillar therebetween. The opposing edges of the sliding doors have seals which form a water-tight seal therebetween. Also, the upper edges of the sliding doors sealingly contact seals mounted on vehicle side frames extending along the upper edge of the door opening to form a water-tight seal therebetween. Guide rails for slidingly suspending the sliding doors are mounted to the side frames in such a manner that they can reinforce the side frames.

Preferably, lower seals are provided between the lower edges of the front and rear doors and the lower side frames for establishing water-tight seal therebetween.

In one aspect of the invention, an automotive vehicle with front and rear sliding doors comprises a front sliding door slidingly supported by a vehicle side member for closing approximately a front half of a door opening, a rear sliding door slidingly supported by the vehicle side member for closing approximately a rear half of the door opening, the rear sliding door having a front edge opposing a rear edge of the front sliding door without a pillar therebetween, a vertical seal provided between opposing rear and front edges of said front and rear doors to establish a water-proof seal, and a horizontal seal provided between upper edges of the front and rear doors and the upper edge of the door opening to establish a water-proof seal.

In another aspect, an automotive vehicle with front and rear sliding doors having no pillar therebetween, comprises a front door adapted to close approximately a front half of a door opening and having upper and lower slider assemblies, a rear door adapted to close approximately a rear half of the door opening and having upper and lower slider assemblies, first upper and lower guide rails engageable with the upper and lower slider assemblies of said front door for slidably supporting the front door, the first upper and lower guide rails extending along upper and lower vehicle side frames and secured thereto, and the first upper and lower guide rails serving to reinforce the vehicle side frames, and second upper and lower guide rails engageable with the upper and lower slider assemblies of the rear door for slidingly supporting the rear door, the second guide rails extending along the vehicle side frames and fixedly secured thereto, and the second guide rails adapted to reinforce the vehicle side frame, whereby the vehicle side frames are sufficiently reinforced by the guide rails to resist bending stresses applied thereto.

BRIEF DESCRIPTION OF THE DRAWINGS

The present invention will be understood more fully from the detailed description given herebelow and from the accompanying drawings of the preferred embodiment of the invention, which, however, should not be taken as limitative to the invention but for elucidation and explanation only.

In the drawings.

DESCRIPTION OF THE PREFERRED EMBODIMENT

Figure 1:
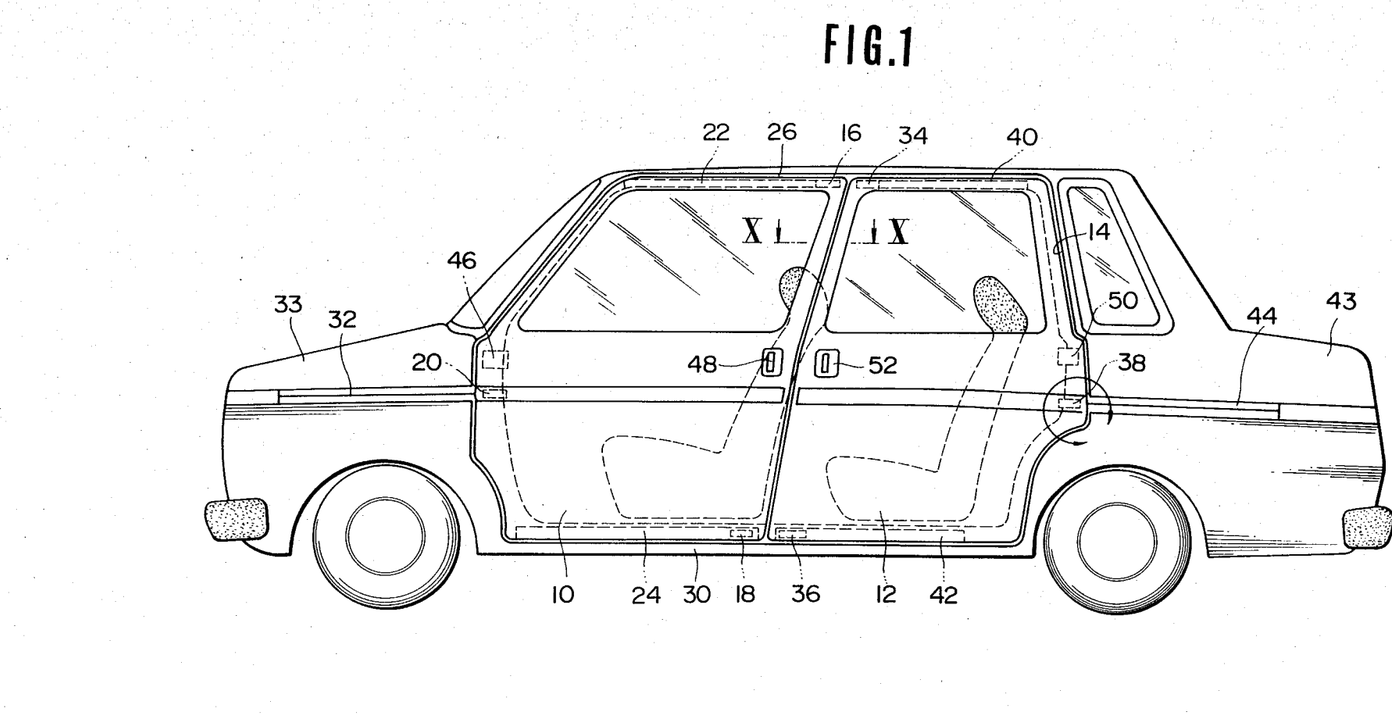
FIG. 1 is an elevation of the preferred embodiment of a center-pillarless automotive vehicle with front and rear sliding doors opposing each other directly.
Figure 2:
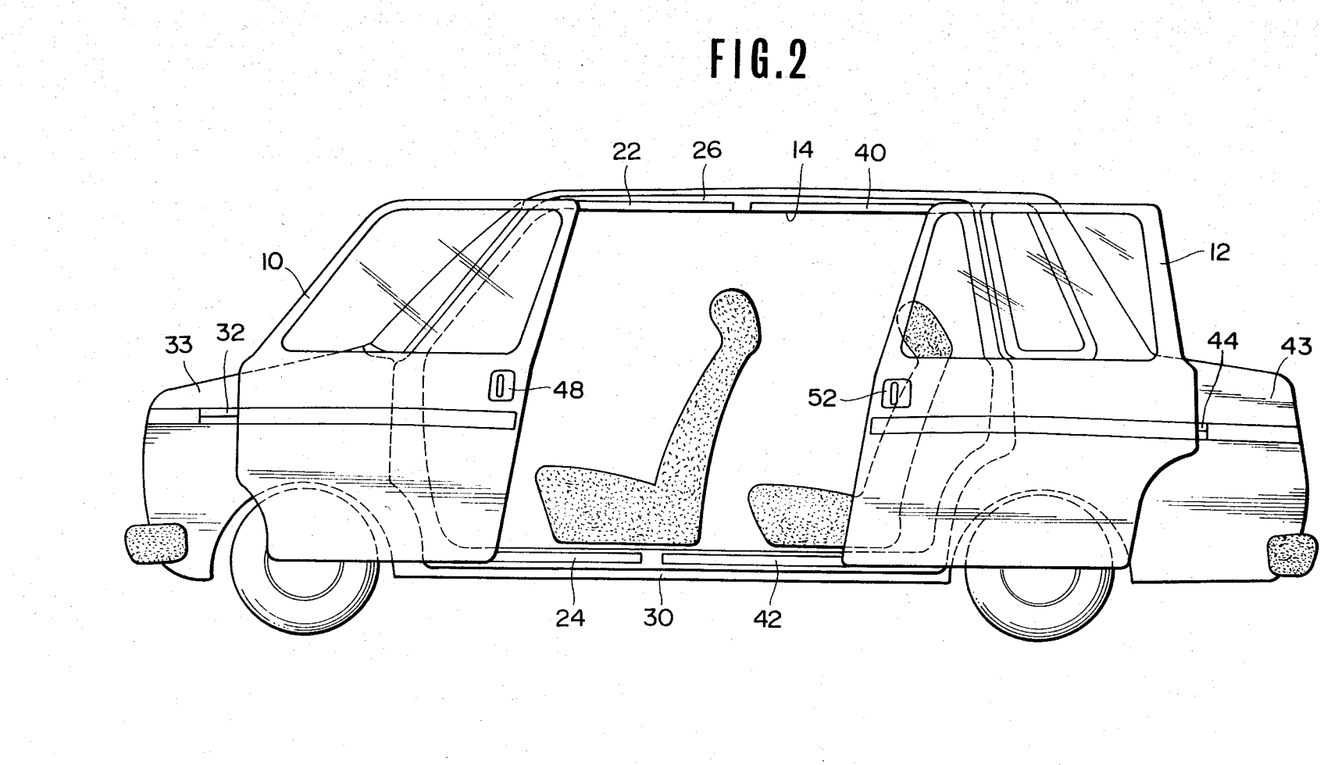
FIG. 2 is a side elevation similar to FIG. 1, but showing the front and rear sliding doors in their fully-open positions.

Referring now to the drawings, particularly to FIGS. 1 and 2, an automotive vehicle as illustrated has front and rear sliding doors 10 and 12 for closing a door opening 14. The front sliding door 10 has upper and lower slider assemblies 16 and 18 at its upper and lower rear corners respectively. The front sliding door 10 is also provided with a waist slider assembly 20 near its front vertical edge. The upper and lower slider assemblies 16 and 18 are respectively engageable with upper and lower guide rails 22 and 24 installed on upper and lower side frames of a vehicle body, such as roof side frame 26 and a side sill 30. On the other hand, the waist slider assembly 20 is engageable with a waist guide rail 32 extending along a front fender 33. Thus, the front sliding door 10 is slidingly suspended from the vehicle body by engagement of the upper, lower and waist slider assemblies 16, 18 and 20 with the upper, lower and waist guide rails 22, 24 and 32.

Likewise, the rear sliding door 12 has upper and lower slider assemblies 34 and 36 at its upper and lower front corners. The rear door 12 is also provided with a waist slider assembly 38 near its rear vertical edge. The upper and lower slider assemblies 34 and 36 are engageable with upper and lower guide rails 40 and 42 installed on the roof side frame 26 and the side sill 30. The waist slider assembly 38 is engageable with a waist guide rail 44 extending along the rear fender 43 of the vehicle body. Thus, the rear sliding door 12 is also slidingly suspended from the vehicle body by engagement of the slider assemblies 34, 36 and 38 with the guide rails 40, 42 and 44.

The front sliding door 10 is provided with a door lock 46 near its front vertical edge. The door lock 46 is connected to a door handle 48 with a linkage mechanism (not shown). Similarly the rear sliding door 12 is provided with a door lock 50 near its rear vertical edge. The door lock 50 is connected to a door handle 52 via a linkage mechanism (not shown).

As apparent from FIGS. 1 and 2, the vehicle body has no center pillar between the rear vertical edge of the front sliding door 10 and the front vertical edge of the rear sliding door 12. Therefore, the rear vertical edge of the front sliding door 10 directly opposes the front vertical edge of the rear sliding door 12.

Hereafter the structure of the rear sliding door and associated guide mechanism will be described in detail with reference to FIGS. 3 to 10 in order to disclose the preferred embodiment more fully. As the front sliding door and guide mechanism is substantially the same as that of the rear sliding door, detailed description thereof will be neglected in order to simplify the disclosure and avoid confusion in understanding.

Figure 3:
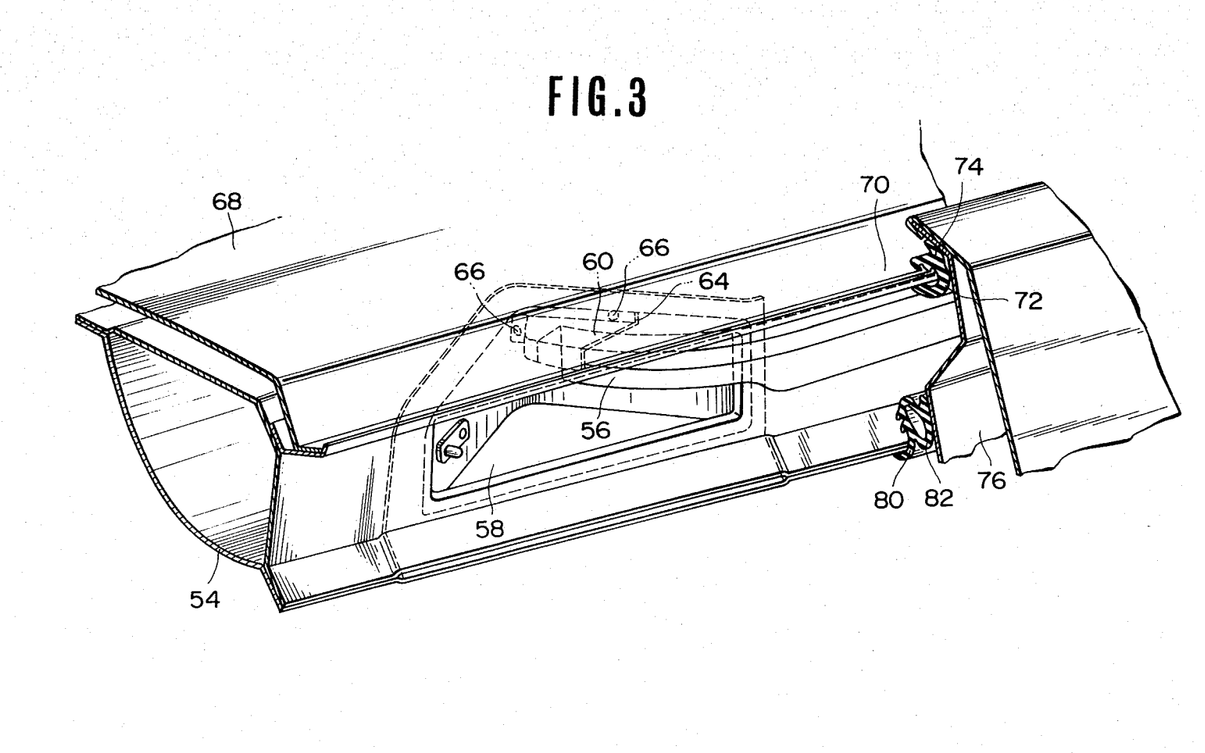
FIG. 3 is an enlarged perspective view of the portion of the vehicle body cooperative with an upper sliding mechanism of the rear sliding door.
Figure 4:
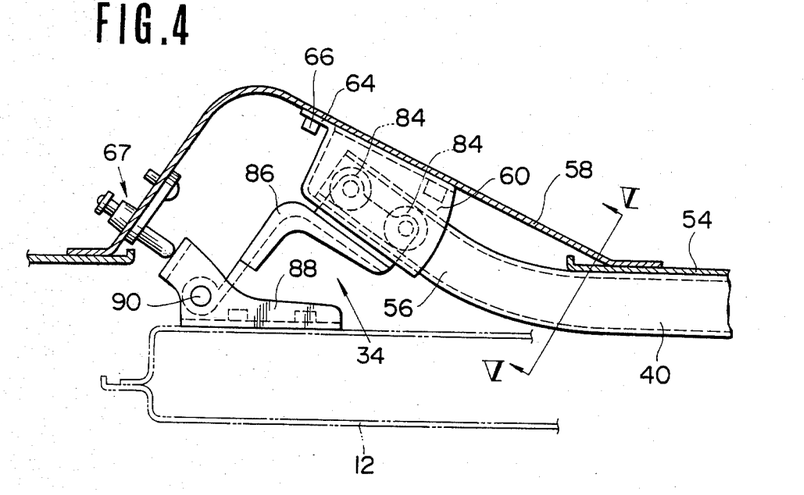
FIG. 4 is a plan view of the essential portions of a rear door sliding mechanism and guide rail with the rear door in its closed position.
Figure 5:
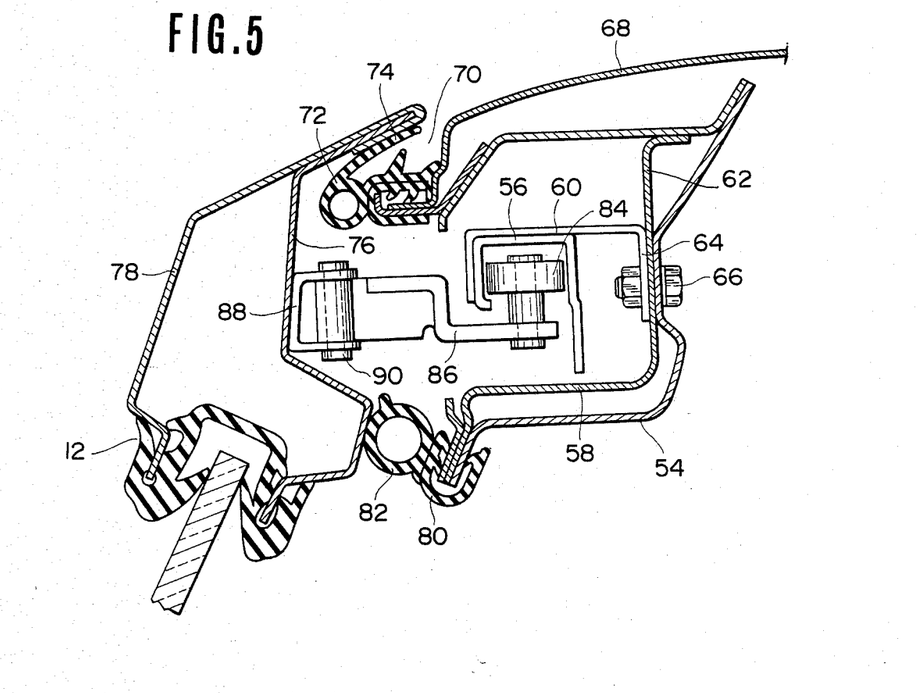
FIG. 5 is a cross-section taken along line V—V of FIG. 4.

As shown in FIGS. 3 to 5, the upper guide rail 40 is mounted on the outer surface of a roof side rail 54 and has a inwardly curved front end portion 56. The curved front end 56 projects through an opening in the roof side rail 54 toward the longitudinal axis of the vehicular, i.e. inwardly. A guide rail support 58 forms an enclosed recess inward of the roof side rail 54 and facing out through the opening thereof. The front end 56 of the upper guide rail 40 is secured to the guide rail support 58 by means of a rail bracket 60 which is secured to a vertical wall 62 of the guide rail support 58 via a flange 64 and fastener bolts 66. A door limit switch 67 for detecting the closed or open state of the rear sliding door 12 is mounted on the guide rail support 58.

As shown particularly in FIGS. 3 and 5, one longitudinal edge of a roof panel 68 is secured to the roof side rail 54 and defines a drip channel 70 in conjunction with a drip seal 72 attached thereto. The drip seal 72 has an essentially vertically extending lip 74. The lip 74 is adapted to sealingly contact the upper edge of the rear sliding door 12 which is formed by crimping the parallel edges of a door inner panel 76 and a door outer panel 78. A body-side weatherstrip 80 is also mounted on the roof side rail 54. The body-side weatherstrip 80 has an outwardly protruding hollow cylindrical section 82. The section 82 is adapted to contact the door inner panel 76 in order to establish a water-proof seal.

As shown in FIGS. 4 and 5, the upper slider assembly 34 comprises a pair of slider rollers 84 rotatably attached to a roller support bracket 86. The roller support bracket 86 is pivotably connected to a channel-shaped base bracket 88 by means of a pivot pin 90. This pivotable structure of the base bracket 88 and the roller support bracket 86 facilitates movement of the rear door during its initial door opening movement or its final door closing movement. In addition, this pivotable structure allows the rear sliding door 12 to be mounted quite close to the vehicle body surface.

Figure 6:
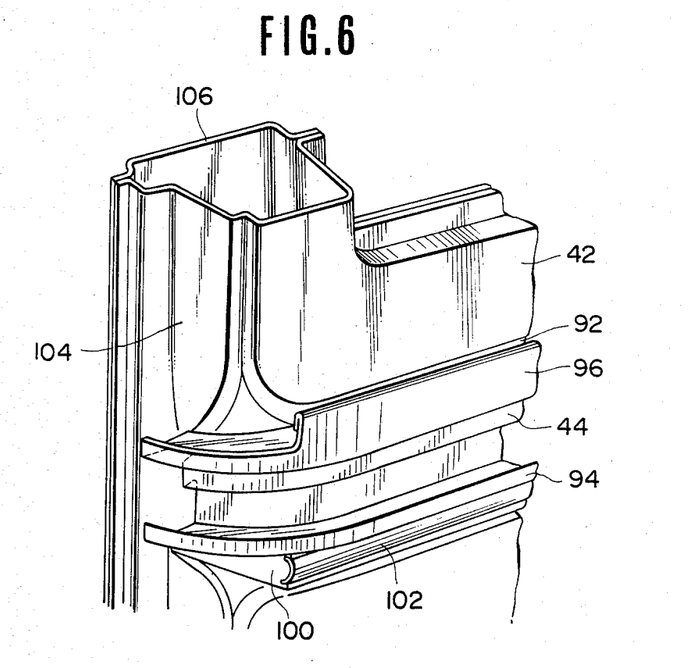
FIG. 6 is an enlarged perspective view of part of a rear fender of the vehicle body, on which a waist guide rail for the rear sliding door is mounted.
Figure 7:
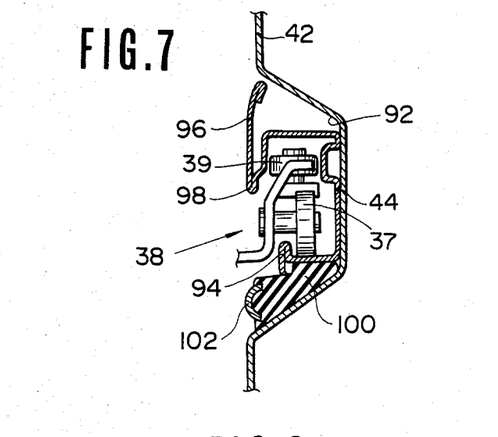
FIG. 7 is a cross-sectional view of the waist guide rail of FIG. 6, including the rear door sliding mechanism.

As shown in FIGS. 6 and 7, the waist guide rail 44 is installed along the rear fender 42 at a waist-high height. The rear fender 42 is formed with a guide rail recess 92 at waist level with sloping upper and lower walls. The waist guide rail 44 is essentially channel-shaped and has a retainer protrusion 94 projecting upwardly from its floor. The waist guide rail 44 is also formed with a waist molding 96 extending from an upper retainer protrusion 98.

The waist guide rail 44 is supported within the guide rail rest 92 by an elastic spacer 100. A molding 102 is attached to the spacer 100. The front end of the waist guide rail 44 curves inward and is fixed to the front-facing surface 104 of a rear pillar 106.

The waist slider assembly 38 comprises a vertical roller 37 and a horizontal roller 39. Both of the vertical and horizontal rollers 37 and 39 are engageable with the waist guide rail 44. The vertical roller 37 is adapted to support the sliding door in connection with a vertical force applied thereto. On the other hand, the horizontal roller 39 is adapted to restrict lateral movement of the sliding door, as shown in FIG. 7.

Figure 8:
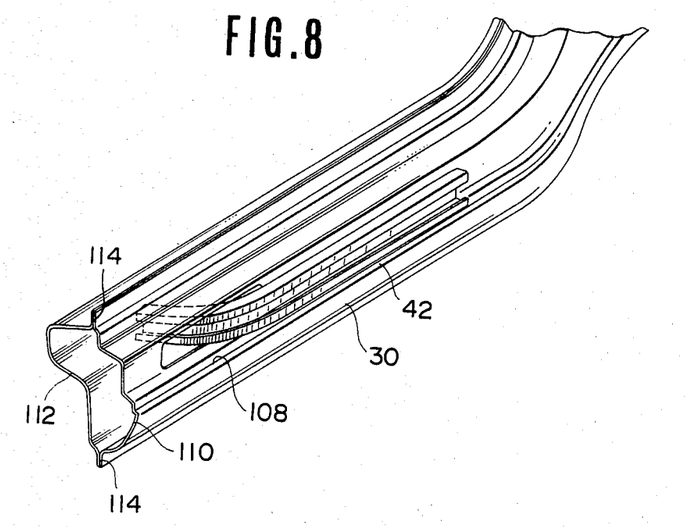
FIG. 8 is an enlarged perspective view of a lower portion of the vehicle body, on which a lower guide rail for the rear sliding door is mounted.
Figure 9:
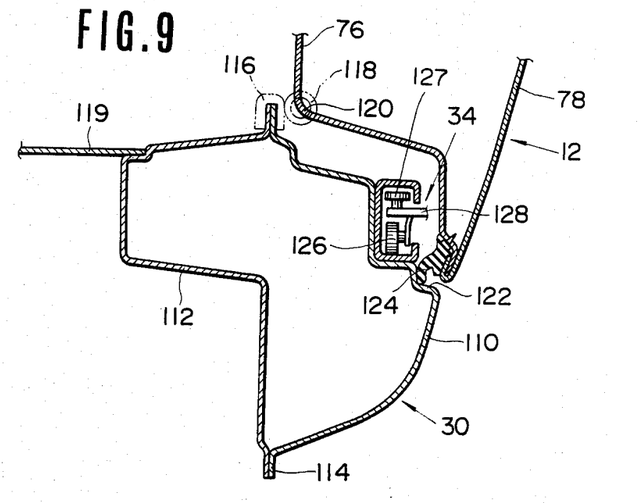
FIG. 9 is a cross-section of the lower guide rail of FIG. 8, including the rear door sliding mechanism.

As shown in FIGS. 8 and 9, the lower guide rail 42 is supported by a longitudinal step 108 formed in a sill outer member 110. The front end of the lower guide rail 24 curves inward and passes through an opening in the side sill 30. The sill outer member 110 is connected to a sill inner member 112 at upper and lower flanges 114. A rubber seal 116 is attached to the upper flange 114 to establish sealing contact with a sealing member 118 mounted on a corner edge 120 of the door inner panel 76.

The sill inner member 112 supports one edge of a floor panel 119. The sill outer member 110 is formed with another step 122 which serves as a sealing seat for a rubber seal 124 mounted along the lower edge of the rear door 12. The lower slider assembly 34 is generally of the same construction as that of the upper slider assembly, namely vertical slider roller 126 and a horizontal slider roller 127 are supported by a roller support bracket 128 which is pivotably attached to a base bracket. The vertical roller 126 is adapted to support the sliding door against vertical force applied thereto. On the other hand, the horizontal roller 127 is adapted to resist against the lateral force to be applied to the sliding door and thereby restricting the lateral movement of the latter.

Figure 10:
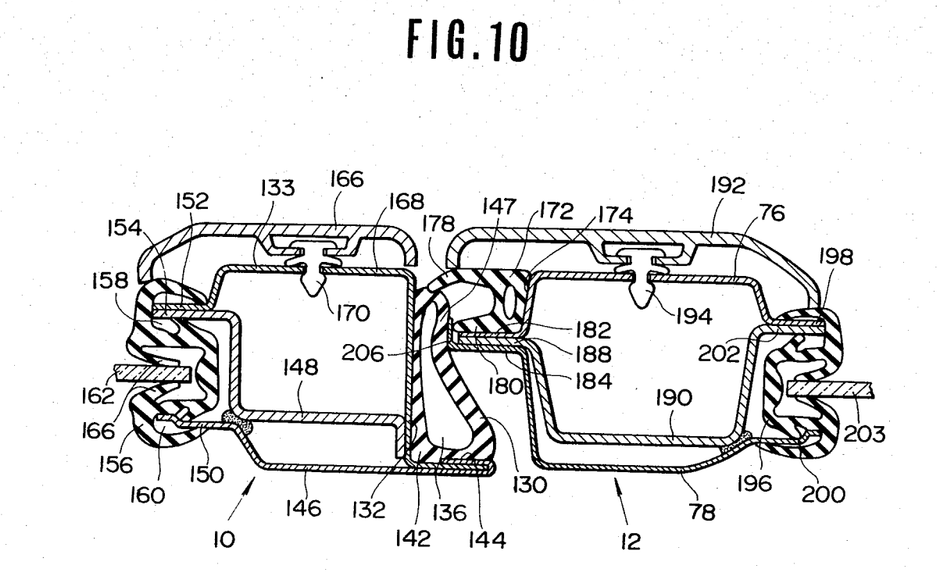
FIG. 10 is a cross-sectional view taken along line X—X of FIG. 1.

As shown in FIG. 10, a weatherstrip 130 is fastened to the vertical surface 132 of the door inner panel 133 of the front door 10 with a resin fastener (not shown). The weatherstrip 130 is of essentially hollow cylindrical structure defining a through opening 136. One wall 142 of the weatherstrip 130 is in contact with the edge of a door outer panel 146 which is crimped back over the rear vertical edge of the door inner panel 133. The front vertical edge of the rear door 12 contacts the weatherstrip 130 at a point 147 to establishing a water-proof seal therebetween when the doors are closed.

The door inner panel 133 and the door outer panel 146 together define an internal space, in which a reinforcement member 148 is inserted. The door outer panel 146 has a flange 150 and the door inner panel has a flange 152 to which a flange 154 of the reinforcement member 148 is attached. A window weatherstrip 156 is fixed to the flanges 150, 152 and 154 at peripheral points 158 and 160. On the other hand, the central area of the window weatherstrip 156 engages the edge of a window pane 162. Lips 166 extend from the walls of the weatherstrip 156 to contact the window pane 162 and so establish a water-proof seal therebetween. A garnish 166 is attached to the surface 168 of the door inner panel 133 facing the vehicle compartment with resin fasteners 170.

Similarly, the weatherstrip 172 of the rear door 12 is mounted on the front vertical surface 174 of the door inner panel 76. The weatherstrip 172 has an essentially U-shaped cross-section featuring lips 178 and 180. The lip 180 is attached to a flange 182 of the door inner panel, which in turn is connected to a flange 184 of a door outer panel 78 of the rear door. A flange 188 of a reinforcement member 190 is interposed between the flanges 182 and 184 of the door inner and outer panels 176 and 186. A garnish 192 is fixed to the surface of the door inner panel 76 facing to the vehicle compartment with a resin fasteners 194. A window weatherstrip 196 is attached to the flanges 198, 200 and 202 of the door inner and outer panels 76 and 78 and the reinforcement member 190. A window pane 203 contacts the window weatherstrip 196 in water-proofing fashion.

The lip 178 is adapted to contact the weatherstrip 130 in order to establish a first inner water-proof seal. The front edge of the flange 184 of the door outer panel 78 is bent to form a contact surface 206. The contact surface 206 of the door outer panel 186 contacts the weatherstrip 130 at point 147 to establish a second outer water-proof seal.

It should be appreciated that, although the upper and lower guide rails for hunging the front sliding door has substantially the same construction as to that for the rear sliding door as set forth, the upper and lower guide rails for the front sliding door are bent at respective rear ends thereof and extending across the upper and lower side frames.

According to the shown embodiment of the invention, the vehicle side frames are reinforced by the guide rails which are primarily adapted to slidingly support the sliding doors. Furthermore, according to the shown embodiment, a water-tight seal can be established between the upper side frame and the upper edge of the doors and between opposing edges of the doors by providing two-point seals at each of the mentioned places.

A vehicle with front and rear sliding door provides greater clearance for getting into or out of the vehicle without causing any problems with regard to the strength of the bodywork, and ensures weather-proofing to prevent rain water or the like from getting into the vehicle compartment.

What is claimed is:

1. An automotive vehicle comprising:
    a front sliding door slidingly supported by a vehicle side member for closing approximately a front half of a door opening;
    a rear sliding door slidingly supported by said vehicle side member for closing approximately a rear half of the door opening, said rear sliding door having a front edge directly opposing a rear edge of said front sliding door when said doors are both in their closed positions;
    upper and lower slider assemblies pivotably attached to each of said doors and engageable to respective upper and lower guide rails mounted on upper and lower side frames of the vehicle side frame, said side frame having openings near the end portions of said guide rails, the front ends of said guide rails curving so as to pass through the openings in said side frame;
    a vertical seal provided between the opposing rear and front edges of said front and rear doors for establishing a water-proof seal; and
    a horizontal seal provided between the upper edges of said doors and the upper edge of said door opening for establishing a water-proof seal.

2. The vehicle as set forth in claim 1, wherein said vertical seal comprises a first weatherstrip attached to the rear vertical edge of said front door and adapted to sealingly contact the front vertical edge of said rear door, and a second weatherstrip attached to the front vertical edge of said rear door and adapted to sealingly contact said first weatherstrip.

3. An automotive vehicle comprising:

a front door adapted to close approximately the front half of a door opening and having upper and lower slider assemblies;

a rear door adapted to close approximately the rear half of said door opening and having upper and lower slider assemblies;

first upper and lower guide rails engageable with said upper and lower slider assemblies of said front door for slidably supporting said front door, said first upper and lower guide rails extending along upper and lower vehicle side frames and secured thereto, and said first upper and lower guide rails serving to reinforce the vehicle side frames; and second upper and lower guide rails engageable with said upper and lower slider assemblies of said rear door for slidingly supporting said rear door, said second guide rails extending along said vehicle side frames and fixedly secured thereto, and said second guide rails adapted to reinforce said vehicle said frame, wherein said vehicle side frames are sufficiently reinforced by said guide rails to resist bending stresses applied thereto;

wherein said upper vehicle side frame has first and second seals lying essentially parallel to the direction of movement of said doors, which first and second seals are adapted to sealingly contact the upper edges of said front and rear sliding doors for establishing water-proof seals;

wherein said front sliding door has a third seal on its rear vertical edge and said rear sliding door has a fourth seal on its front vertical edge, said third and fourth seals being adapted to establish a two-point water-proof seal between the opposing vertical edges of the front and rear doors;

wherein said third seal is adapted to sealingly contact the front edge of said rear door to establish a first water-proof seal and said fourth seal is adapted to sealingly contact said third seal to establish a second water-proof seal; and wherein each of said vehicle side frames is formed with a step extending parallel to the longitudinal axis thereof and supporting said guide rail, each of said guide rails being secured to the step of the side frame to reinforce the side frame.

4. An automotive vehicle comprising:

a front door adapted to close approximately the front half of a door opening and having upper and lower slider assemblies;

a rear door adapted to close approximately the rear half of said door opening and having upper and lower slider assemblies;

first upper and lower guide rails engageable with said upper and lower slider assemblies of said front door for slidably supporting said front door, said first upper and lower guide rails extending along upper and lower vehicle side frames, each of said side frames being formed with a step extending parallel to the longitudinal axis thereof and supporting said guide rail each of said guide rails being secured to the step of the side frame to reinforce said side frame; and second upper and lower guide rails engageable with said upper and lower slider assemblies of said rear door for slidingly supporting said rear door, said second rails extending along said vehicle side frames and fixedly secured to said step of said side frame, and said second guide rails adapted to reinforce said vehicle side frame, wherein said vehicle side frames are sufficiently reinforced by said guide rails to resist bending stress applied thereto.

* * * * *